US010437521B2

(12) United States Patent
Joseph et al.

(10) Patent No.: US 10,437,521 B2
(45) Date of Patent: Oct. 8, 2019

(54) CONSISTENT METHOD OF INDEXING FILE SYSTEM INFORMATION

(71) Applicant: NetApp, Inc., Sunnyvale, CA (US)

(72) Inventors: James Namboorikandathil Joseph, Karnataka (IN); Sisir Shekhar, Karnataka (IN); Michael Eisler, Colorado Springs, CO (US)

(73) Assignee: NETAPP, INC., Sunnyvale, CA (US)

( * ) Notice: Subject to any disclaimer, the term of this patent is extended or adjusted under 35 U.S.C. 154(b) by 651 days.

(21) Appl. No.: 15/081,017

(22) Filed: Mar. 25, 2016

(65) Prior Publication Data
US 2017/0277739 A1 Sep. 28, 2017

(51) Int. Cl.
*G06F 3/06* (2006.01)
*G06F 16/18* (2019.01)

(52) U.S. Cl.
CPC ............ *G06F 3/067* (2013.01); *G06F 3/064* (2013.01); *G06F 3/0619* (2013.01); *G06F 3/0643* (2013.01); *G06F 16/1865* (2019.01)

(58) Field of Classification Search
USPC ....................................... 707/609
See application file for complete search history.

(56) References Cited

U.S. PATENT DOCUMENTS

| | | | |
|---|---|---|---|
| 9,116,819 B2* | 8/2015 | Cope | G06F 12/0866 |
| 9,507,843 B1* | 11/2016 | Madhavarapu | G06F 16/2358 |
| 9,552,242 B1* | 1/2017 | Leshinsky | G06F 11/0727 |
| 9,910,742 B1* | 3/2018 | Faibish | G06F 11/1469 |
| 9,916,311 B1* | 3/2018 | Bent | G06F 17/30218 |
| 10,013,316 B2* | 7/2018 | Cadarette | G06F 11/00 |
| 10,049,122 B1* | 8/2018 | Faibish | G06F 17/30224 |
| 10,078,639 B1* | 9/2018 | Faibish | G06F 17/30221 |
| 10,083,082 B2* | 9/2018 | Chiu | G06F 11/1407 |
| 2002/0108017 A1* | 8/2002 | Kenchammana-Hoskote | G06F 12/0804 711/113 |
| 2007/0185926 A1* | 8/2007 | Prahlad | G06F 17/30997 |
| 2008/0301084 A1* | 12/2008 | Demarest | G06F 17/30011 |
| 2008/0301284 A1* | 12/2008 | Demarest | G06Q 10/10 709/224 |
| 2009/0254610 A1* | 10/2009 | Arthursson | G06F 9/45504 709/203 |
| 2010/0280651 A1* | 11/2010 | Edling | G11B 23/042 700/214 |
| 2011/0066808 A1* | 3/2011 | Flynn | G06F 12/0246 711/118 |
| 2011/0276781 A1* | 11/2011 | Sengupta | G06F 12/0862 711/216 |
| 2012/0143831 A1* | 6/2012 | Amulu | G06F 17/30914 707/687 |

(Continued)

*Primary Examiner* — Cam Linh T Nguyen
(74) *Attorney, Agent, or Firm* — Klein, O'Neill & Singh, LLP

(57) ABSTRACT

Disclosed is a system that will update the metadata index at the consistency point. Accordingly, the metadata index will be updated at the same time that the data blocks and metadata updates are written to disk. Furthermore, the metadata index will be written in the same location as the file system data, and accordingly, when a snapshot is taken of the file system, the metadata index will also be copied and saved with the snapshot. Accordingly, the metadata index will travel with the snapshots of the filesystem, and will be up to date with the latest changes to the file data blocks.

20 Claims, 4 Drawing Sheets

(56) References Cited

U.S. PATENT DOCUMENTS

| | | | |
|---|---|---|---|
| 2013/0024460 A1* | 1/2013 | Peterson | G06F 3/061 707/741 |
| 2013/0227236 A1* | 8/2013 | Flynn | G11C 16/26 711/165 |
| 2014/0108707 A1* | 4/2014 | Nowoczynski | G06F 12/0246 711/103 |
| 2015/0134926 A1* | 5/2015 | Yang | G06F 3/0611 711/167 |
| 2016/0070652 A1* | 3/2016 | Sundararaman | G06F 3/0619 711/154 |
| 2016/0188221 A1* | 6/2016 | Janik | G06F 3/0611 711/103 |
| 2016/0301753 A1* | 10/2016 | Auch | G06F 15/167 |

* cited by examiner

CONSISTENT METHOD OF INDEXING FILE SYSTEM INFORMATION

FIELD

The disclosure relates to data storage systems.

BACKGROUND

The following description includes information that may be useful in understanding the present disclosure. It is not an admission that any of the information provided herein is prior art or relevant to the presently claimed disclosure, or that any publication specifically or implicitly referenced is prior art.

File Server or Filer

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Storage Operating System

As used herein, the term "storage operating system" generally refers to the computer-executable code operable on a computer that manages data access and may, in the case of a filer, implement file system semantics. The storage operating system can also be implemented as an application program operating over a general-purpose operating system, such as UNIX® or Windows NT®, or as a general-purpose operating system with configurable functionality, which is configured for storage applications as described herein.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. For instance, this allows batch writes. A write-anywhere file system may initially assume an optimal layout such that the data is substantially contiguously arranged on disks. The optimal disk layout results in efficient access operations, particularly for sequential read operations, directed to the disks.

Physical Disk Storage

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In some examples, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

File System Metadata

Many deployments of file systems include massive amounts of metadata. For instance, in a write-anywhere file layout, the metadata may be stored in files. For instance, the meta-data may be stored in three different files: (1) the I-node file, which contains the inodes for the file system, (2) the Block-map files, which identifies free blocks, and (3) the I-node-map files, which identifies free inodes. Systems must be in place to allow users to search the metadata at various times.

BRIEF DESCRIPTION OF THE DRAWINGS

The accompanying drawings, which are incorporated in and constitute a part of this specification, exemplify the embodiments of the present disclosure and, together with the description, serve to explain and illustrate principles of the disclosure. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
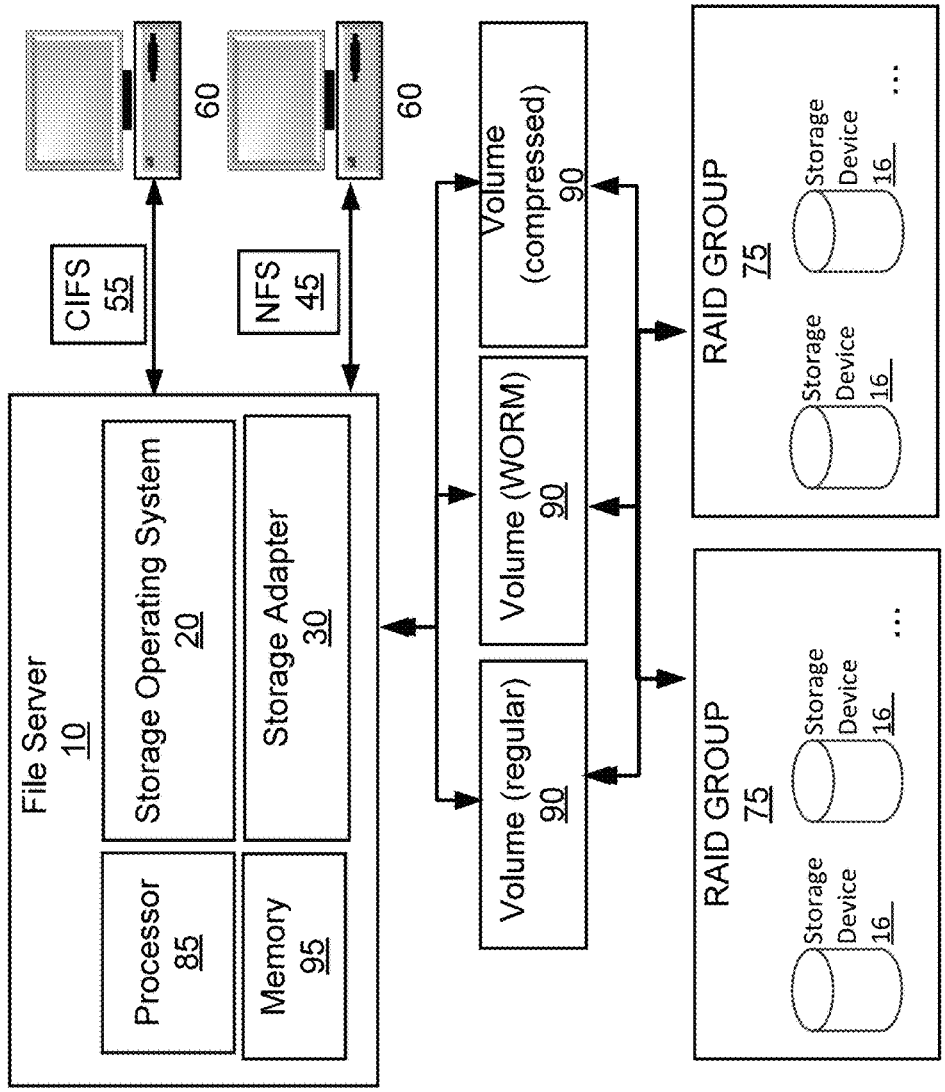
FIG. 1 depicts, in accordance with various embodiments of the present disclosure, a diagram representing a storage system.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION

Unless defined otherwise, technical and scientific terms used herein have the same meaning as commonly understood by one of ordinary skill in the art to which this disclosure belongs. One skilled in the art will recognize many methods and materials similar or equivalent to those described herein, which could be used in the practice of the present disclosure. Indeed, the present disclosure is in no way limited to the methods and materials specifically described.

Various examples of the disclosure will now be described. The following description provides specific details for a thorough understanding and enabling description of these examples. One skilled in the relevant art will understand, however, that the disclosure may be practiced without many of these details. Likewise, one skilled in the relevant art will also understand that the disclosure can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the disclosure. Indeed, certain terms may even be emphasized below; however, any terminology intended to be interpreted in any restricted manner will be overtly and specifically defined as such in this Detailed Description section.

Overview

When a client based I/O operation is performed, generally data blocks need to be saved or modified in the file system by the storage operating system and metadata relating to those blocks needs to be updated. Accordingly, the data blocks and the updates to the metadata need to be processed and saved to the database. In some cases, especially in systems that use write anywhere file layouts—where new writes or modifications are written to new locations—the system will utilize a log (for example in NVRAM) where a set of writes will be accumulated. Accordingly, at some point in time (for e.g., a "consistency point"), the data blocks and updates to the metadata will be written to disk all at once, in blocks allocated all at once. This allows for efficient write operations.

However, although the metadata will be written to disk at the consistency point, the metadata index will not be, and rather will be updated sequentially, or at a later time. Rather, the metadata index is updated later in existing systems, and placed in a separate queue that is not searchable or accessible to the users. Accordingly, there exist periods of time when a user will not be able to search the metadata index for the most updated metadata information.

Furthermore, at each consistency point, a snapshot of the file system (e.g., a copy of all the root inode files) will be made and saved to disk. However, the metadata index file is copied with the root inode files, and therefore will not be saved to disk with the snapshot. Accordingly, when snapshots are revived, the metadata index may not always be consistent with the snapshot, as it will not contain the most reason updates to the metadata that are contained in the snapshot.

Accordingly, disclosed is a system that will simultaneously update the metadata index at the consistency point. Accordingly, the metadata index will be updated at the same time that the data blocks and metadata updates are written to disk. Furthermore, the metadata index will be written in the same location as the file system data, and accordingly, when a snapshot is taken of the file system the metadata index will also be copied and saved with the snapshot. That way the metadata index will travel with the file system copies, and will always be up to date with the latest changes to the file data blocks.

File System Metadata

Many deployments of file systems include massive amounts of metadata. For instance, in a write-anywhere file layout, the metadata may be stored in files. For instance, the meta-data may be stored in three different files: (1) the I-node file, which contains the inodes for the file system, (2) the Block-map files, which identifies free blocks, and (3) the I-node-map files, which identifies free inodes.

The file system metadata may be organized in trees of inodes, with an inode at the top of a file that points to many lower level inodes, which in turn point to lower level still inodes. At some point, the lowest level of inodes will point to actual regular file data blocks. Accordingly, the inodes are a map to all of the data in a particular file.

Accordingly, the storage operating system may copy the map of the entire file system by copying all of the inodes at a particular time. This can be performed at a consistency point, when all of the metadata files are updated after the new data files are written to disk. At that point, a snapshot maybe taken so that if data is updated and a new inode is copied to a new location, the old snapshot can be accessed to retrieve the data before the update, etc.

Each snapshot is taken after a consistency point that flushes all new writes and changes to disk that are currently stored in logs (e.g. NVRAM). Accordingly, the snapshot will be up to date, and will be taken at a point when the changes or dirty data in the logs have been flushed to disk, and the metadata has been flushed to disk. For instance, a file operating system may gather up hundreds of NFS write requests before a scheduled consistency point (e.g. every 10 seconds) gathers up the requests, and allocates blocks for all requests in the consistency point at once. This allows efficient writes.

Metadata Indexing

Additionally, an index must be created for all of the metadata created in order for a user to be able to search the metadata efficiently. Accordingly, once the new/modified data blocks are flushed/written to disk, then the new metadata must be indexed or the fields related to the updated data must be updated in the index. The index is saved somewhere on disk, and allows the system to search efficiently through metadata.

The index may be partitioned in various methods, for example in a file system hierarchy. In this example, each partition may include the information for a sub-tree of a file tree structure metadata. Accordingly, each partition would contain an index of files in the sub-tree, and information (other metadata) about those files. In some cases, each partition may be separately versioned, to allow for time-travelling inquires and to simplify updates. Accordingly, there may be a baseline index and an incremental index.

Example Storage System

FIG. 1 illustrates an overview of an example of a storage system according to the present disclosure. The storage system may include a non-volatile storage such as a Redundant Array of Independent Disks (e.g., RAID system), one or more hard drives, one or more flash drives and/or one or more arrays. The storage system may be communicatively coupled to the host device as a Network Attached Storage (NAS) device, a Storage Area Network (SAN) device, and/or as a Direct Attached Storage (DAS) device.

In some embodiments, the storage system includes a file server 10 that administers a storage system. The file server 10 generally includes a storage adapter 30 and a storage operating system 20. The storage operating system 20 may be any suitable storage system to access and store data on a RAID or similar storage configuration.

The storage adaptor 30 is interfaced with one or more RAID groups 75 or other mass storage hardware components. The RAID groups include storage devices 160. Examples of storage devices 160 include hard disk drives, non-volatile memories (e.g., flash memories), and tape drives. The storage adaptor 30 accesses data requested by clients 60 based at least partially on instructions from the operating system 20.

Each client 60 may interact with the file server 10 in accordance with a client/server model of information delivery. That is, clients 60 may request the services of the file server 10, and the file server 10 may return the results of the services requested by clients 60 by exchanging packets encapsulating, for example, Transmission Control Protocol (TCP)/Internet Protocol (IP) or another network protocol (e.g., Common Internet File System (CIFS) 55 and Network Files System (NFS) 45 format.

The storage operating system 20 implements a file system to logically organize data as a hierarchical structure of directories and files. The files (e.g. volumes 90) or other data batches may, in some embodiments, be grouped together and either grouped in the same location or distributed in different physical locations on the physical storage devices 160. In some embodiments, the volumes 90 will be regular volumes, dedicated WORM volumes 90, or compressed volumes 90.

Example 1: Indexing Log File

Figure 2:
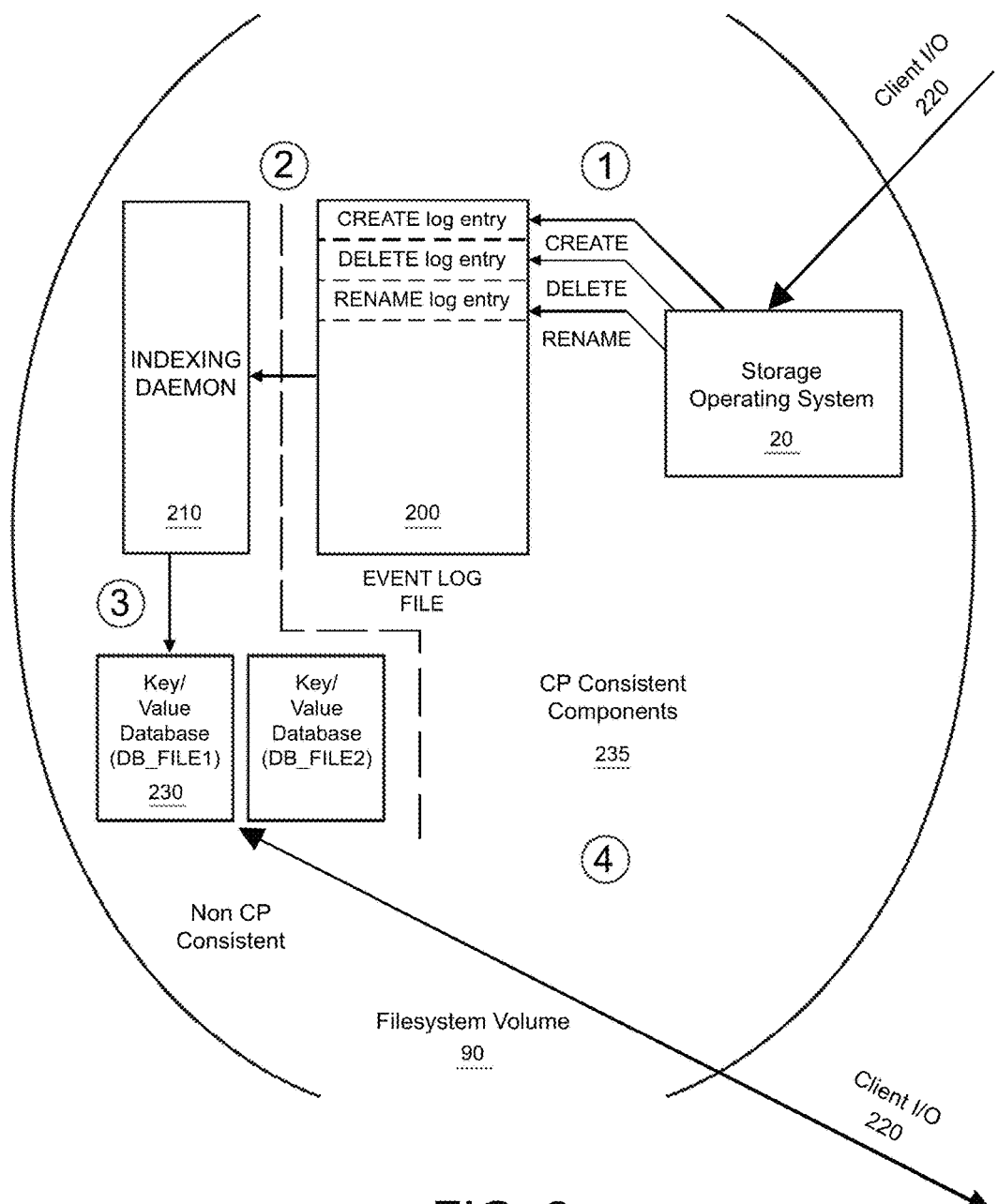
FIG. 2 depicts, in accordance with various embodiments of the present disclosure, a diagram of indexing metadata during a consistency point.
Figure 3:
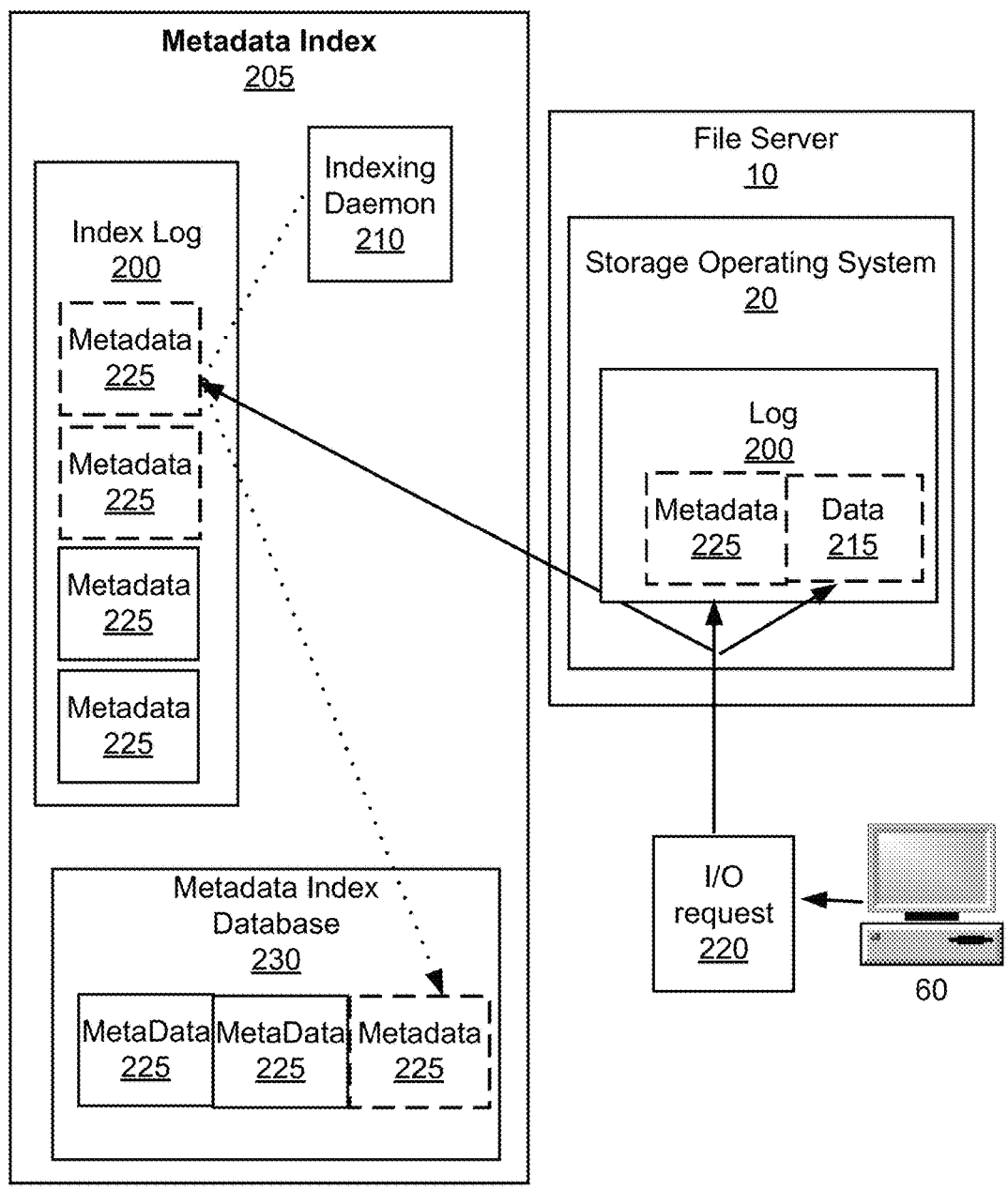
FIG. 3 depicts, in accordance with various embodiments of the present disclosure, a diagram of components of a metadata index.

FIG. 2 illustrates an embodiment of a system that updates a metadata index 205 after a client I/O operation 220 is performed and the updates to the metadata and the new data blocks are written to disk. As illustrated in FIG. 3, for example, if a client requests an NFS write operation from the storage operating system 20, the write request will create data blocks 215 that need to be written to disk which will also create updated metadata 225 for the data blocks that need to be written to disk. Accordingly, the data blocks 215 and metadata 225 will be entered into a log 200 (e.g. a temporary buffer or memory location, for instance NVRAM) (illustrated in FIG. 3).

At some time point after the metadata and data block updates are entered into the log 200, they will be processed and downloaded and written to the disk 160. This is called a consistency point 235, for example. This is performed to ensure that the new data blocks 215 and the metadata 225 representing those data blocks 215 are downloaded and saved to disk consistently—so that the metadata reflects the saved data blocks 215 and the appropriate files can be located.

In some embodiments, and as shown in FIG. 3, the new metadata 225 will also be saved into a metadata index database 230 so that the user can search the index 205 to determine the changes in the files based on the user I/O operation for example. This will allow users to search the metadata index 205 to identify certain files or data blocks 215 or determine certain histories of the data blocks 215.

However, in prior implementations, the operating system would not update the metadata index during or simultaneously with the consistency point 235. Rather, the metadata index database 205 would be updated at some point after the consistency point 235 (or at least would not be required to be updated at the same time), and therefore the metadata index 205 generally did not reflect the most recent updates to the metadata 225 for the data blocks 215. Accordingly, a user would not be able to search the metadata index 205 and gain information about the most recently saved or modified files (e.g. data blocks 215 updates). This is problematic, because users frequently look for files that they most recently saved, for example when a user forgets the file's location, or wants to view the history of that specific file.

Therefore, if the indexing of the metadata is at least partially performed (or required to be performed) during or by the finish of the consistency point 235, the user can always search for and identify the most recent updates to the metadata. Accordingly, disclosed herein is a system in which a consistency point 235 requires, in addition to saving the updated metadata 225 and data blocks 215, the system to also index the updated metadata in a metadata index 205.

As discussed below, the indexing steps performed during the consistency point 235 may vary, but always result in some portion or combination of elements of the metadata index 205 including the updated metadata information. Depending on the performance of the systems, different levels of metadata indexing, or different numbers of indexing steps may be required during the consistency point 235, to ensure a user has at least some potential to search the most recently saved metadata 225.

In one embodiment of the present disclosure, and as illustrated in FIG. 3, the metadata index 205 will be divided into the following components: (1) an index log file 200 that will be saved to disk and log all metadata file changes for indexing (metadata 225), (2) an indexing daemon 210 or other module or process, (3) and an index database 230 where the index is actually stored by the indexing daemon 210. The index log file 200 will be a log file 200 where the new metadata or metadata changes based on operations (e.g. client I/O operations) are recorded sequentially.

Then, an indexing daemon 210 may process the metadata in the index log file 200 and save the metadata into a metadata index database 230 for searching and retrieval by the user. Accordingly, the user can then access the index database 230 using client input or output processes/protocols 220 such as APIs to access the storage operating system 20.

As show in FIG. 3, the metadata 225 may be saved in the index database 230 in a manner that is efficient for searching for the files. For instance, a metadata index 205 generally may include an index that is organized according to the file system hierarchy. For example, each portion or sub-tree (e.g. set of branches or branch) of a file system tree may be saved into a different partition of a metadata index database 230. Accordingly, each partition would include: (1) the files included in that portion/branch of the tree of the file system and (2) the metadata associated with each of the files in that portion of the tree of the file system.

Additionally, when the tree is updated, the portion of the tree that was updated could be saved in a separation position or partition of the index database. In another example, the updates could be saved incrementally, with a baseline index and various time sequential updates. Accordingly, this will allow for efficient, incremental updates to the index that do not require updating the entire partition for each time a portion of a file system tree is updated.

Figure 4:
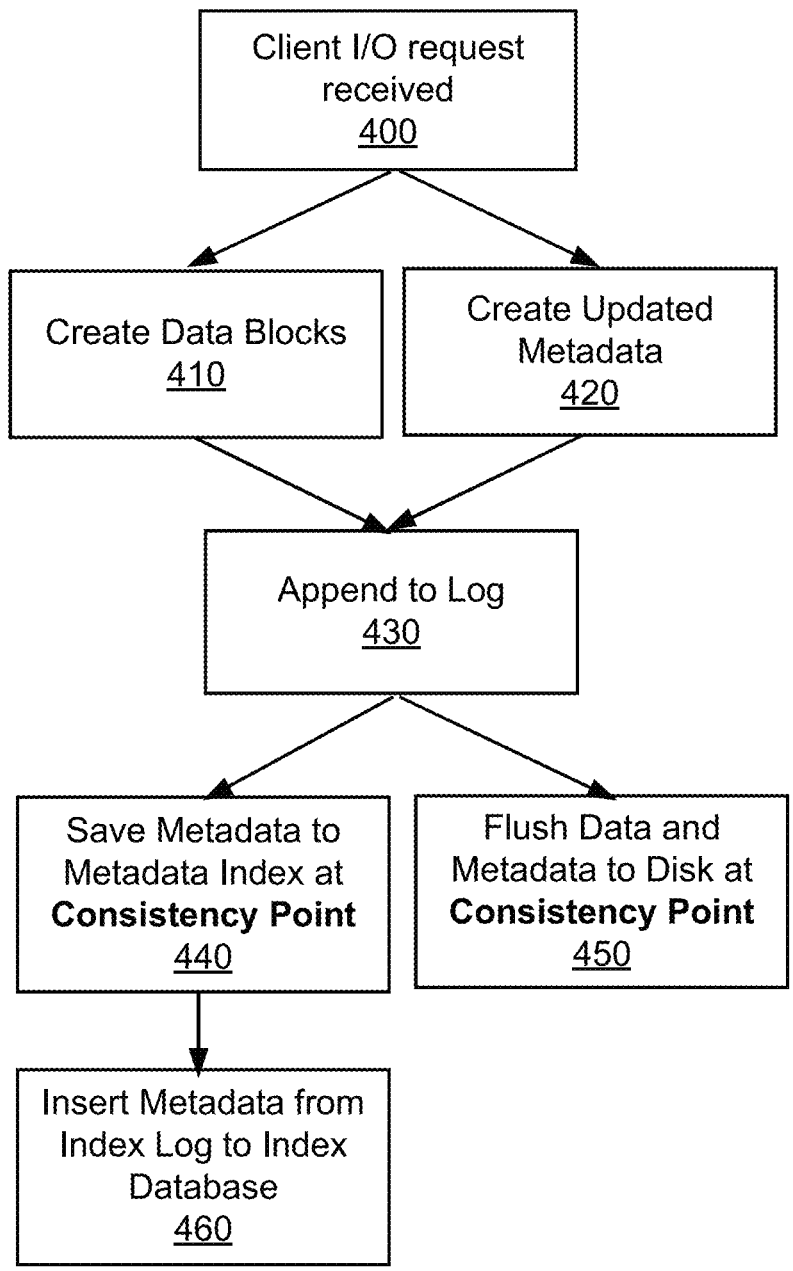
FIG. 4 depicts, in accordance with various embodiments of the present disclosure, a flow chart illustrating a process for saving metadata into an index.

FIG. 4 illustrates an example process accordingly to the present disclosure. For instance, first a client I/O 220 request is received 400 by a server hosting an operating system 20. Then, the storage operating system 20 process the I/O request 220 and creates data blocks 410 and associated metadata 420 related to the data blocks. The metadata 225 and data blocks 215 are then appended to a log 430, such as a memory buffer, non-volatile memory based log, or other log as disclosed herein.

At regular intervals called a consistency point, the data 215 and metadata 225 entries on the log may be saved to disk 450. Accordingly, at this step they will be saved to the database on the RAID system 75 or other storage system. Then, the metadata 225 entries will also be saved to the metadata index 440 at the consistency point. Accordingly, at the consistency point, the metadata index 205, metadata 225, and data 215 will be consistent in the snapshot taken at that time.

In some examples, where the metadata entries are appended to a metadata index log 200 at the consistency point (rather than saved directly in the index database 230), the metadata 225 entries on the metadata index 205 will need to be inserted and catalogued in the metadata index database 460 by an indexing daemon 210 or other process or module. Accordingly, as disclosed herein, this allows the system to efficiently save the metadata index entries to the index log 200 at the consistency point, while later saving and indexing the entries in the metadata index database 230. Accordingly, at any consistency point, the metadata index log 200 and the database 230 together will contain all of the metadata index data captured at the consistency point.

Saving of Metadata Index Database

The metadata index database 205 may be saved to disk along with the data blocks 215 and metadata 225 of the file system. In some embodiments, snapshots or copies of the inodes to preserve the system at certain points in time may also include the metadata index 205. Accordingly, when snapshots or copies of the file system are moved, a consistent metadata index 205 will move with it, so that the metadata index associated with each prior snapshot may be conveniently searched.

For instance, a pointer to the metadata database index 205 for each file system may be included in a superblock, or in the root inode for a file system. Accordingly, when the root inodes are copied for a cloning operation, the pointers to the index at a certain consistency point will be preserved.

CONCLUSIONS

It will be understood to those skilled in the art that the techniques described herein may apply to any type of special-purpose computer (e.g., file serving appliance) or general-purpose computer, including a standalone computer, embodied as a storage system. To that end, the filer can be broadly, and alternatively, referred to as a storage system.

The teachings of this disclosure can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the disclosed techniques described herein.

Similarly while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed.

Moreover, the modules may be combined together within the disclosure, or divided into additional modules based on the particular function desired. Thus, the disclosure should not be construed to limit the present disclosure, but merely be understood to illustrate one example implementation thereof.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The various methods and techniques described above provide a number of ways to carry out the disclosure. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

The invention claimed is:

1. A method, comprising:
    generating, by a processor of a storage server, a set of data blocks for a write request from a client device for a file system of a storage operating system executed by the storage server, wherein the data blocks are temporarily saved to a log at a memory device of the storage server, and metadata for the data blocks is appended to the log by the processor;
    updating, by the processor, an index log of a metadata index with the metadata from the log during a consistency point, wherein the metadata index includes the index log and a metadata index data structure;
    wherein the index log records new metadata for data blocks that are written for a first time and tracks sequential changes to existing metadata entries for existing data blocks stored by the file system at any given time;
    wherein the metadata index data structure includes an index to a file system hierarchy used for searching data stored by the file system;
    flushing, by the processor, the data blocks and the metadata from the log to a storage device at the consistency point for persistent storage; and
    using, by the processor, metadata entries from the updated index log to update the metadata index data structure;
    wherein a point in time copy of the file system taken at the consistency point provides a current state of the file system with the flushed data blocks and the metadata, and the metadata index;
    wherein the metadata index after the consistency point is used to search for most recent metadata updates for stored data blocks.

2. The method of claim 1, wherein an indexing daemon processes the index log to update the metadata index data structure.

3. The method of claim 2, wherein the metadata index data structure is a searchable metadata database updated by the indexing daemon.

4. The method of claim 3, wherein the index log is updated with the metadata at the consistency point and the indexing daemon saves the metadata to the metadata database after the consistency point.

5. The method of claim 1, wherein a consistency point operation is executed at regular intervals to flush the log and the index log for persistent storage at the storage device.

6. The method of claim 1, wherein the index log and the log are stored at a non-volatile, random access memory (NVRAM).

7. The method of claim 1, wherein the index log is stored at the storage device that is part of a redundant array of independent disk (RAID) system.

8. A non-transitory machine readable medium having stored thereon instructions for performing a method, comprising machine executable code which when executed by at least one machine, causes the machine to:
    generate, by a processor of a storage server, a set of data blocks for a write request from a client device for a file system of a storage operating system executed by the storage server, wherein the data blocks are temporarily saved to a log at a memory device of the storage server, and metadata for the data blocks is appended to the log by the processor;
    update, by the processor, an index log of a metadata index with the metadata from the log during a consistency point, wherein the metadata index includes the index log and a metadata index data structure;
    wherein the index log records new metadata for data blocks that are written for a first time and tracks sequential changes to existing metadata entries for existing data blocks stored by the file system at any given time;
    wherein the metadata index data structure includes an index to a file system hierarchy used for searching data stored by the file system;
    flush, by the processor, the data blocks and the metadata from the log to a storage device at the consistency point for persistent storage; and
    use, by the processor, metadata entries from the updated index log to update the metadata index data structure;
    wherein a point in time copy of the file system taken at the consistency point provides a current state of the file system with the flushed data blocks and the metadata, and the metadata index;
    wherein the metadata index after the consistency point is used to search for most recent metadata updates for stored data blocks.

9. The non-transitory machine readable of claim 8, wherein an indexing daemon processes the index log to update the metadata index data structure.

10. The non-transitory machine readable medium of claim 9, wherein the metadata index data structure is a searchable metadata database updated by the indexing daemon.

11. The non-transitory machine readable medium of claim 10, wherein the machine is further caused to:
  receive, by the storage operating system, a metadata search request; and
  process, by the storage operating system, the metadata search request by searching the metadata database and the index log.

12. The non-transitory machine readable medium of claim 10, wherein the index log is updated with the metadata at consistency point and the indexing daemon saves the metadata to the metadata database after the consistency point.

13. The non-transitory machine readable of claim 8, wherein the index log and the log are stored at a non-volatile, random access memory (NVRAM).

14. A computing device comprising:
  a memory containing machine readable medium comprising machine executable code having stored thereon instructions for performing a method; and a processor of a storage server coupled to the memory:
  generate a set of data blocks for a write request from a client device for a file system of a storage operating system executed by the storage server, wherein the data blocks are temporarily saved to a log at a memory device of the storage server, and metadata for the data blocks is appended to the log by the processor;
  updating an index log of a metadata index with the metadata from the log during a consistency point, wherein the metadata index includes the index log and a metadata index data structure;
  wherein the index log records new metadata for data blocks that are written for a first time and tracks sequential changes to existing metadata entries for existing data blocks stored by the file system at any given time;
  wherein the metadata index data structure includes an index to a file system hierarchy used for searching data stored by the file system;
  flush the data blocks and the metadata from the log to a storage device at the consistency point for persistent storage; and
  use metadata entries from the updated index log to update the metadata index data structure;
  wherein a point in time copy of the file system taken at the consistency point provides a current state of the file system with the flushed data blocks and the metadata, and the metadata index;
  wherein the metadata index after the consistency point is used to search for most recent metadata updates for stored data blocks.

15. The computing device of claim 14, wherein an indexing daemon processes the index log to update the metadata index data structure.

16. The computing device of claim 14, wherein the metadata index data structure is a searchable metadata database updated by the indexing daemon.

17. The computing device of claim 16, wherein the machine executable code is further caused to:
  receive, by the storage operating system, a metadata search request; and
  process, by the storage operating system, the metadata search request by searching the metadata database and the index log.

18. The computing device of claim 16 wherein the machine executable code is further caused to:
  receive, by the storage operating system, a metadata search request; and
  process, by the storage operating system, the metadata search request by searching the metadata database.

19. The computing device of claim 14, wherein the index log and the log are stored at a non-volatile, random access memory (NVRAM).

20. The computing device of claim 16, wherein the index log is updated with the metadata at consistency point and the indexing daemon saves the metadata to the metadata database after the consistency point.

* * * * *